Patented Aug. 5, 1924.

1,503,702

UNITED STATES PATENT OFFICE.

HAROLD A. MORTON, OF AKRON, OHIO.

RUBBER VULCANIZATION AND PRODUCT THEREOF.

No Drawing.　　Application filed October 12, 1921. Serial No. 507,372.

*To all whom it may concern:*

Be it known that I, HAROLD A. MORTON, a citizen of the United States, and resident of Akron, Ohio, have invented certain new and useful Improvements in Rubber Vulcanization and Products Thereof, of which the following is a specification.

My said invention relates to the vulcanization of rubber and has for its objects the increase in the rapidity of the vulcanization process and the production of a rubber compound considerably superior both in tensile strength and durability and the invention includes the novel process or method and product hereinafter described and particularly defined by the appended claims.

According to the said invention there is added to the rubber, or rubber-like substance, prior to vulcanization with sulphur, a small quantity of ethylene diamine or any of its derivatives.

By the addition of this substance or any of its derivatives to a rubber mixture in an appropriate quantity based on the rubber content, and then elevating the temperature, as is practiced in the art, a well vulcanized product is obtained in a very short time. Moreover there are additional advantages, namely, that the resulting rubber compound has a very high tensile strength and a remarkable durability.

Some of the derivatives of ethylene diamine that may be used are: ethylene diamine borate, ethylene diamine carbonate, ethylene diamine citrate, ethylene diamine hydrate, ethylene diamine stearate, the condensation product of ethylene diamine with benzaldehyde, the condensation product of ethylene diamine with phenyl mustard oil, the condensation product of ethylene diamine with anthra-quinone, etc.

It is understood, however, that I regard myself as in no way limited by these examples, and can use any other derivative of ethylene diamine that I choose.

The following examples are given:—

Example I.

100 pts. smoked sheets of rubber.
87 pts. zinc oxide.
4 pts. magnesium oxide.
8 pts. sulphur.
1 pt. ethylene diamine.

The mixing is then heated to 140°–145° C. and vulcanization is complete in about six minutes.

Example II.

90 parts smoked sheets of rubber.
4 pts. sulphur.
5 pts. zinc oxide.
1 pt. benezylidene ethylene diamine.

The temperature of the mixing is then raised to 140°–145° C. and vulcanization is complete in about 15 minutes.

Example III.

100 pts. smoked sheets of rubber.
87.5 pts. zinc oxide.
4 pts. magnesium oxide.
8 pts. sulphur.
0.5 pt. ethylene diamine carbonate.

When this mixing is given a press cure at 140°–145° C., vulcanization is complete in about 15 minutes.

Example IV.

100 pts. smoked sheets of rubber.
87 pts. zinc oxide.
4 pts. magnesium oxide.
8 pts. sulphur.
1 pt. ethylene diamine stearate.

When the temperature of this mixing is raised to 140°–145° C. vulcanization is complete in about 8 minutes.

The forgoing examples serve to show how the accelerators may be used but I do not limit myself to these examples as variations may be made without departing from the spirit of the invention.

What I claim is:—

1. The herein described method of accelerating the vulcanization of natural or artificial rubber or rubber-like substances by vulcanizing the same in the presence of ethylene diamine or any of its derivatives.

2. The herein described method which consists in mixing with a rubber compound a small percentage of ethylene diamine or any of its derivatives, and thereafter raising the temperature of the compound.

3. A rubber mixture containing before vulcanization, ethylene diamine or its derivatives.

4. An article of manufacture obtained by vulcanizing a rubber mixture in the presence of ethylene diamine or its derivatives.

In testimony whereof, I affix my signature.

HAROLD A. MORTON.